United States Patent [19]

Navarette et al.

[11] Patent Number: 5,014,603

[45] Date of Patent: May 14, 1991

[54] HYDRAULIC ACTUATOR HAVING FRANGIBLE OR DEFORMABLE COMPONENTS

[75] Inventors: Carlos A. Navarette, Canoga Park; Eric M. Mashita, Canyon Country, both of Calif.

[73] Assignee: Allied-Signal Inc., Morris Township, Morris County, N.J.

[21] Appl. No.: 431,005

[22] Filed: Nov. 2, 1989

[51] Int. Cl.[5] .......... F16J 15/16

[52] U.S. Cl. .......... 92/165 R; 92/168; 92/169.1; 92/228; 92/248; 277/164

[58] Field of Search .......... 92/165 R, 168, 169.1, 92/205, 243, 241, 248; 277/164

[56] References Cited

U.S. PATENT DOCUMENTS

| | | | |
|---|---|---|---|
| 2,783,715 | 3/1957 | Kraus | 92/205 |
| 3,155,014 | 11/1964 | Genz | 92/205 |
| 3,176,595 | 4/1965 | Schwartz | 92/243 |
| 3,884,127 | 5/1975 | Simmons | 92/151 |
| 4,122,759 | 10/1978 | Runkel et al. | 92/168 |
| 4,185,542 | 1/1980 | York et al. | 92/166 |
| 4,211,151 | 7/1980 | Wallischeck | 92/168 |
| 4,300,439 | 11/1981 | Degnan et al. | 92/146 |
| 4,831,916 | 5/1989 | Leigh-Monstevens et al. | 92/248 |
| 4,831,920 | 5/1989 | Cornell | 92/258 |
| 4,883,413 | 11/1989 | Perevuznik et al. | 277/164 |

*Primary Examiner*—Ronald C. Capossela
*Attorney, Agent, or Firm*—Robert C. Smith; Terry L. Miller; Robert A. Walsh

[57] ABSTRACT

A linear hydraulic actuator of small size having limited clearance between the inside of the cylindrical housing and the outside of the piston rod is provided with a deformable or frangible piston of an engineered plastic material which is sufficiently strong to survive normal operation of the actuator but which will break or deform if the cylinder is punched through or "petalled" causing inward projections tending to block movement of the piston. Another embodiment discloses a plastic end gland which is frangible, or deformable in the event of an impact deforming the rod such that it would not pass through the end gland except for such deformation. Because of the relative weakness of the plastic material, the width of the land on the piston acting against the inside of the cylinder is maximized by placing the dynamic seals at or near its outside circumferential edges. Similarly, the internal surface of the plastic end gland also has a dynamic seal at an outer edge to maximize the width of the surface against which the piston rod moves. In either case, fragments of the plastic members are not of such strength as to block movement of the rod when it is being moved by another undamaged actuator.

12 Claims, 2 Drawing Sheets

HYDRAULIC ACTUATOR HAVING FRANGIBLE OR DEFORMABLE COMPONENTS

The present invention relates to hydraulic actuators, primarily for aircraft, having frangible components to enhance survivability of the associated aircraft from ballistic action and more particularly to a unique construction of such actuator using piston and/or rod end glands of a suitable thermoplastic material.

There have been many designs of hydraulic actuators for dealing with damage caused by hostile gunfire. Normally such actuators are employed in pairs or greater numbers such that if one actuator is lost, another can continue to operate the control surface or other aircraft component. This redundant scheme will not be successful, however, if a damaged actuator is jammed such that the additional actuators or actuator cannot move it.

BACKGROUND OF THE INVENTION

One approach to the problem has been to form the pistons of such actuators of brittle material which is strong enough for normal operation but having weak sections which break away if forced against an internally projecting deformation of the cylinder. This permits the rod and piston to be moved past the damaged part of the cylinder. Another design uses frangible layers of plastic material on the interior surface of the cylinder and/or the exterior surface of the rod such that inward deformation or "petalling" of the metal cylinder will, in most cases, be less than the thickness of the plastic layer. Hence the piston, which is sized to the interior of the plastic layer, will pass even though the actuator is inoperative. Should a projectile penetrate to the point of impacting on the rod, deforming the rod, it will also break away the plastic layer on the outside of the rod. Since the port in the rod end gland is sized to the plastic layer on the rod, the rod will pass through the end gland even if deformed substantially.

The above described designs are useful and effective if the actuator is sufficiently large to provide clearance for the broken away or deformed parts. Many small actuators are used, however, in which the clearance between the cylinder bore and the piston rod diameters is quite small, leaving insufficient space to accommodate broken away or deformed metal parts. The presence of such deformed or broken parts may result in requiring excessively high loads to unjam the actuator. There is, therefor, a need for a design for small actuators which will enable them to avoid jamming if hit by ballistic fire.

SUMMARY OF THE INVENTION

Because it is known that thermoplastic materials will deform plastically under local point contact this appeared to provide a possible solution. Certain engineering type plastics appear to have sufficient strength to withstand the operating pressures in an actuator under normal conditions but the placing of seal grooves on such a plastic piston has presented a problem. The use of conventional seal grooves, conventionally located, so weakens the already marginally strong plastic piston that it will experience structural failure at lower than normal operating pressures and/or at a sharp seal radius under a pressure impulse. Applicants have found that if the required seals can be incorporated into the thermoplastic components without using the usual centrally located deep groove and without the sharp seal radii, this will eliminate failures at this point. By locating such seals on the outside edge or edges of the piston, for example, the deep central groove is eliminated, most of the width of the piston is preserved for strength and different types of ring energized seals can be used. Larger seal fillet radii can be used providing better fatigue resistance. Since the thermoplastics are seal materials in themselves, a certain amount of compression of the sides of the components (piston or end gland) will often provide sufficient sealing of the piston against the rod, for example.

DETAILED DESCRIPTION OF THE PREFERRED EMBODIMENT

Figure 1:
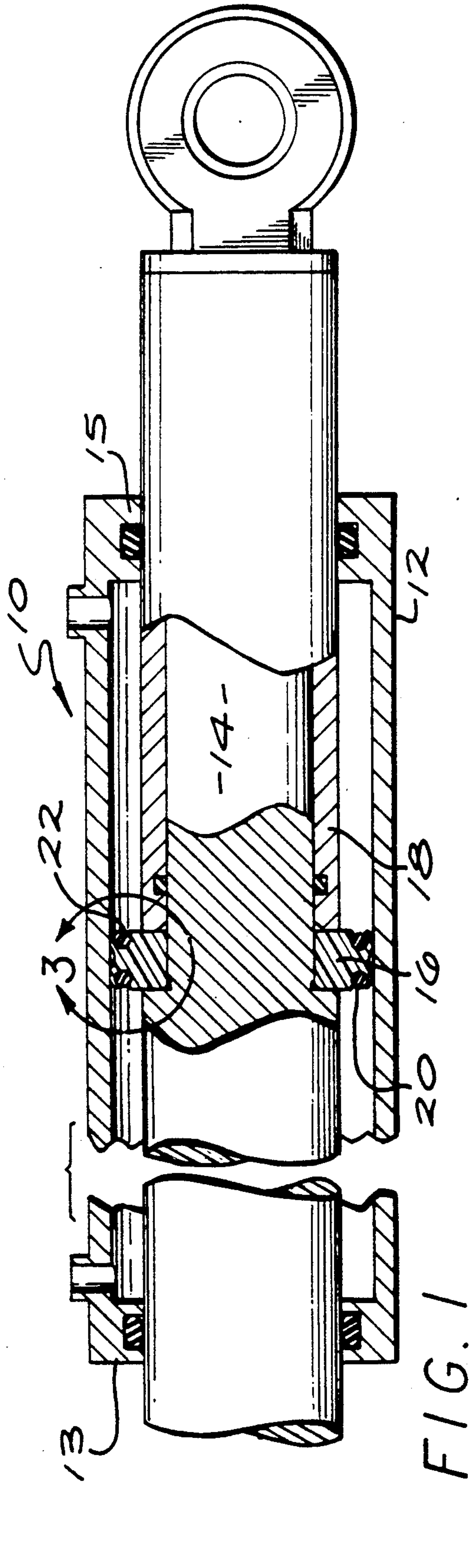
FIG. 1 is a cross sectional drawing of a typical installation of a frangible piston installed in an actuator wherein the clearance between the rod and cylinder is small such that piston fragments would be likely to cause jams interfering with movement of the rod.

Referring now to FIG. 1 a small diameter actuator 10 is shown including a cylindrical housing 12 having a plurality of ports for ingress and egress of hydraulic fluid and including a head end gland 13, a piston rod 14 passing through said head end gland and a rod end gland 15, and a piston 16 which is captured between a shoulder on rod 14 and a collar 18 which may be threadedly engaged or otherwise removably secured to said rod. Piston 16 is formed of a strong engineering plastic material with properties of high stiffness and low shear strength such as Arlon 1555 made by Greene, Tweed & Co. Located at the outer circumferentiated edges of piston 16 are a pair of dynamic seals 20 and 22, discussed in more detail below.

Figure 2:
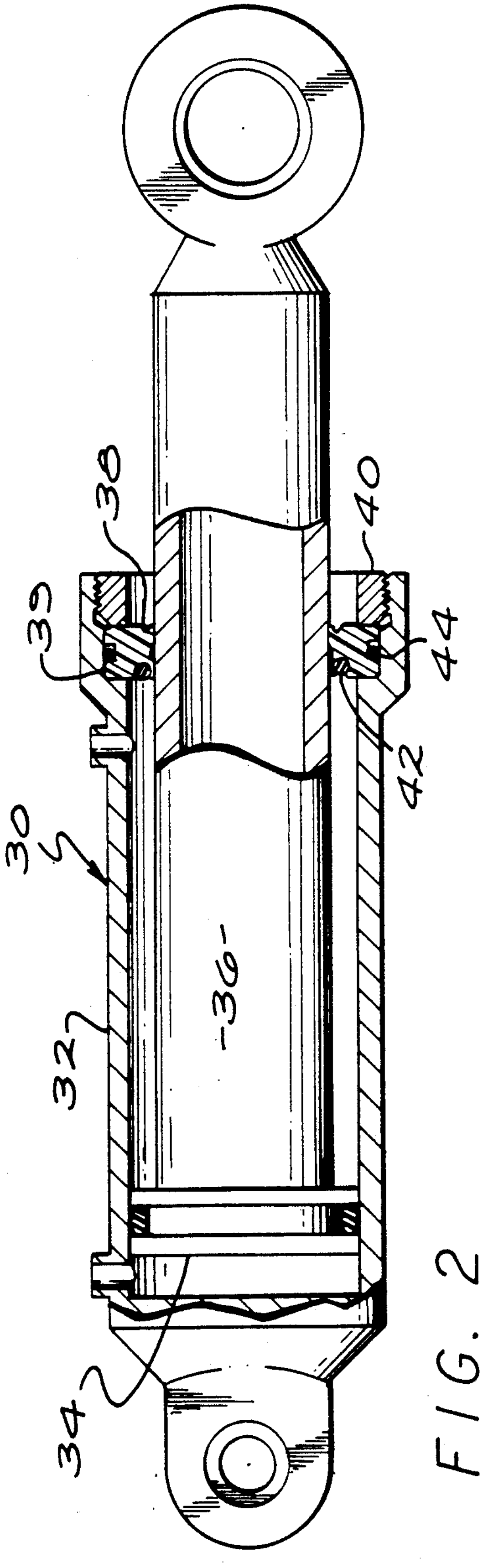
FIG. 2 is a cross sectional drawing of an actuator having small clearance between the piston rod and the cylinder having a frangible or deformable rod end gland.

FIG. 2 shows a similar type of small diameter actuator 30 including a cylindrical housing 32 with fluid access ports, a piston 34 and a rod 36 in said housing, a separate generally annular rod end gland 38 abutting against a shoulder 39 on the inside of cylinder 32, and a spanner nut 40 threadedly engaged with the inside surface of the cylinder 30 at the end adjacent the gland, such that it secures gland 38 against shoulder 39. Rod end gland 38 is formed of an engineering plastic such as Arlon 1555, described above, or a plastic having similar properties. A dynamic seal 42 is formed on an inner circumferential edge of gland 38 such that it is adjacent to piston rod 36. Gland 38 may also include a static seal 44 on its outer circumferential surface sealing against the inside of the cylindrical housing. Seal 42 is, or may be essentially the same as seals 20 and 22 of FIG. 1, except that it seals to the inside against rod 36 rather than to the outside against the cylinder. Seal 44 may be a conventional O-ring in a groove.

Figure 3:
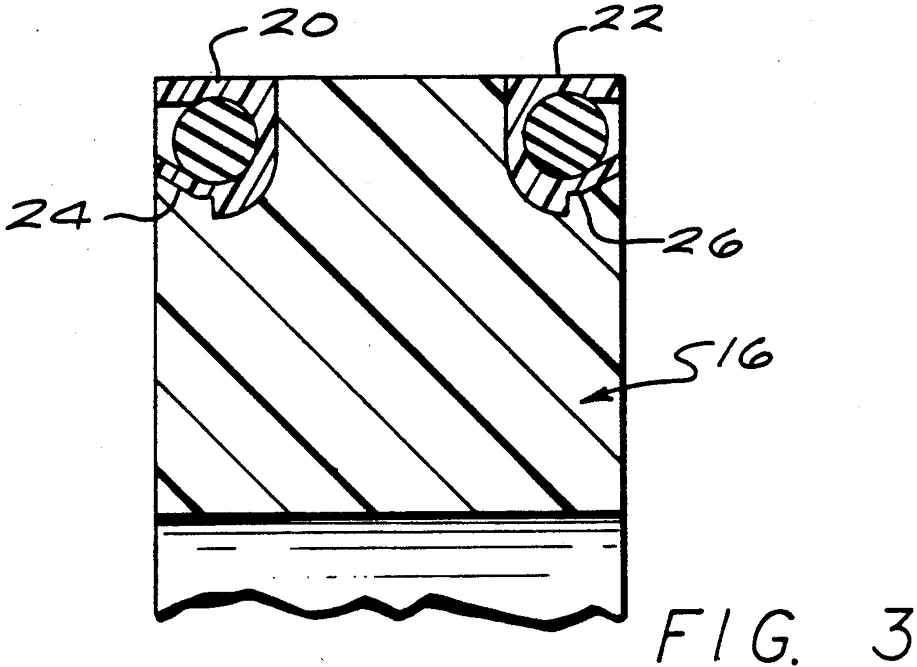
FIG. 3 is an enlarged cross sectional drawing of a portion of FIG. 1, showing the seal structure in greater detail.

FIG. 3 is an enlarged cross-sectional drawing of a portion of FIG. 1 showing the structure of piston 16 and seals 20 and 22 in greater detail. As set forth above, the seals are placed in grooves 24 and 26 on the outer circumferential edges of piston 16 thereby leaving an uninterrupted load carrying land width which in this embodiment is about 50% of the width of the entire piston. It could be made somewhat wider, if desired if it were thought necessary to provide more strength for normal operation. Each seal consists of a hollow annular seal jacket of polytetrafluorethylene (Teflon) carrying a rubber O-ring which is sized to provide a force tending to urge the upper surface of the seal against the inside surface of cylinder 12. Because of the flexibility of piston 16, it will tend to be compressed against piston rod 14 by the compression of collar 18, so an additional seal against the piston rod 14 is usually not necessary. The seal 42 of FIG. 2 is, or may be, essentially the same as seals 20 and 22 except that it is designed to exert a force inwardly against piston rod 36.

Figure 4:
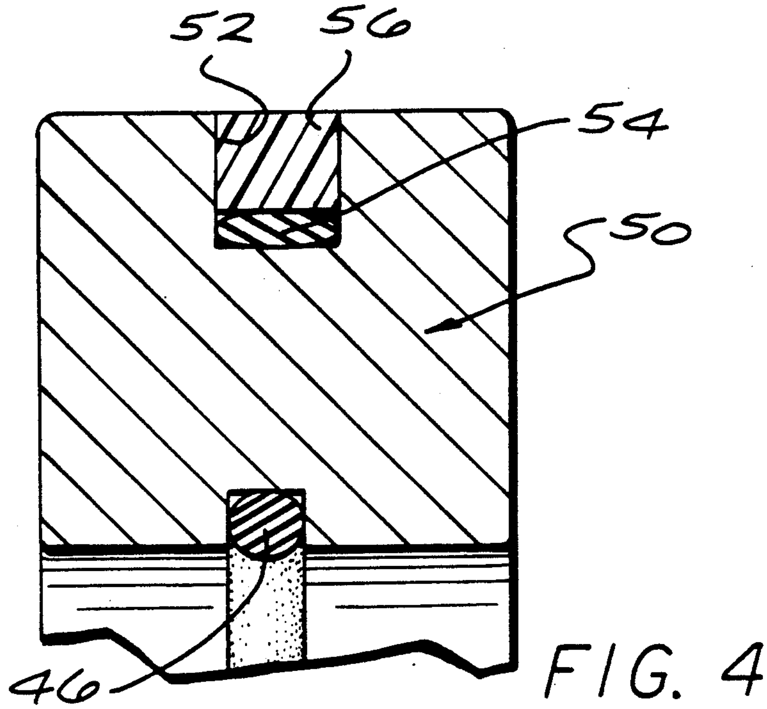
FIG. 4 PRIOR ART
FIG. 4 is a cross sectional drawing at approximately the same scale as FIG. 3, of a corresponding part of a conventional (prior art) piston.

FIG. 4 is a cross-sectional drawing of a part of a conventional piston exemplary of the prior art, drawn at approximately the same scale as FIG. 3. In this piston 50, which is of metal, the seal groove 52 is centered on the circumferential face of the piston and is formed with a fairly small radius (typically such as 0.01") at the bottom of the groove. An O-ring 54 at the bottom of groove 52 exerts a force urging the Teflon ring seal 56 outwardly against the inside of the cylinder. Piston 50 will preferably also carry a static seal 46 on its inner diameter against the piston rod which seal may be a conventional O-ring in a groove. With a steel piston, for example, the groove location resulting in two small lands acting against the cylinder and the small radius fillets at the bottom of the groove do not normally result in weak spots such as could cause failure of the piston. Such a piston is normally very strong and not frangible as is the case of the piston of FIG. 3. Should a piston like that of FIG. 4 be formed of the plastic material described above, probable failure in normal operation would result because the two small radius fillets would be weak spots susceptible to fatigue as the narrow lands on each side of the seal are urged back and forth against the cylinder wall in normal operation.

Applicants' piston design, as shown in FIGS. 1 and 3 provides substantially greater width in the land contacting the cylinder and the seal grooves have much larger radii thereby avoiding the concentration of stress such as would occur in the structure of FIG. 4. Thus such a piston design is relatively stiff and will survive in normal operation, but if jammed into a petal deformation of the cylinder wall due to its low shear strength the piston will cut and pull through or will deform and pull around a dent in the cylinder wall.

Similarly, an actuator having a rod end gland 38 such as described in connection with FIG. 2, will also deform and extrude or split if a deformed rod 36 is forced through it. Yet this end gland has sufficient strength and stiffness to withstand normal operating forces.

While only a limited number of embodiments are described herein it is recognized that modifications will be apparent to those skilled in the art. Obviously, any particular cylindrical actuator may be formed with either or both of the frangible or deformable parts described above. The teachings herein are clearly useful with cylindrical actuators employed in tandem or in parallel.

We claim:

1. A linear hydraulic actuator including a metal cylindrical housing, having a rod end gland secured to said housing, a piston in said housing and a metal piston rod attached to said piston and extending through said rod end gland, the clearance between said rod and the interior of said housing being small relative to the diameter of said rod characterized in that one of said piston and said rod end gland is of a frangible or deformable plastic material having a surface which is subjected to relative movement against an opposing metal surface, at least one seal groove is formed in said plastic material adjacent said opposing metal surface, said seal groove being formed at an outside edge of said material to thereby leave an uninterrupted width of plastic material adjacent said opposing metal surface, a dynamic seal of low friction fluorocarbon material at said groove having an interior passage and an exterior surface adapted to contact said opposing metal surface, and a resilient member in said interior passage urging said exterior surface against said opposing metal surface.

2. A linear hydraulic actuator as claimed in claim 1 wherein said piston is of a frangible or deformable plastic material, said rod includes means for removably securing said piston to said rod, said piston includes first and second seal grooves at its outside diameter at each edge thereof, and dynamic seals in said grooves sealing against the inside surface of said cylinder, with the land between said seals adjacent said cylinder being at least substantially half the width of said piston.

3. A linear hydraulic actuator as claimed in claim 2 wherein said rod includes a shoulder, said piston is abutted against said shoulder, and a collar is removably fastened to said rod compressing said piston between said shoulder and itself.

4. A linear hydraulic actuator as claimed in claim 1 wherein said rod end gland is of a frangible or deformable plastic material, a seal groove is formed on its inside diameter of said rod end gland at its inside edge and said dynamic seal is in said groove.

5. A linear hydraulic actuator as claimed in claim 4 wherein the inside surface at said cylinder includes a shoulder and is threaded adjacent said rod end gland and fastener means is threadedly engaged with said threaded inside surface to secure said end gland against said shoulder.

6. A linear hydraulic actuator as claimed in claim 1 wherein both said piston and said rod end gland are of frangible or deformable plastic material and said piston includes first and second grooves on the outside edges of said piston adjacent the inside wall of said cylinder and dynamic seals in said grooves.

7. A linear hydraulic actuator including a cylindrical housing, a rod end gland, and a piston and a piston rod attached to said piston and extending through said rod end gland, the clearance between said rod and the interior of said housing being small relative to the diameter of said rod, characterized in that said piston is of a frangible thermoplastic material, said rod includes a shoulder against which said piston abuts and a collar fastened to said rod and abutting against said piston to secure said piston in place against said shoulder and said piston includes a first seal groove at its outside diameter at one edge and a second seal groove at its outside diameter at the opposite edge thereof, and seals in said grooves of low friction fluorocarbon material having hollow interior passages and exterior surfaces adapted to contact the interior of said cylinder, and resilient members in said interior passages urging said exterior surfaces against said cylinder.

8. A linear hydraulic actuator as claimed in claim 7 wherein said collar is adjustable to compress said piston between itself and said shoulder on said rod to force said piston to expand radially inwardly to seal against said rod.

9. A linear hydraulic actuator as claimed in claim 7 wherein said piston includes a groove on its inner diameter surface and a seal is carried in said groove.

10. A linear hydraulic actuator as claimed in claim 7 wherein said cylinder includes an annular inwardly extending shoulder on its interior surface adjacent said rod end gland, said rod end gland is of frangible thermoplastic material, and a spanner nut is threadedly engaged with said interior surface such that it compresses said rod end gland against said inwardly extending shoulder.

11. A linear hydraulic actuator as claimed in claim 10 wherein a seal groove is formed near the center of the outside cylindrical surface of said rod end gland and a seal is carried in said seal groove, a second seal groove is formed on the inside diameter of said rod end gland adjacent said rod, and dynamic seal means are placed in said second seal groove.

12. A linear hydraulic actuator as claimed in claim 11 wherein said dynamic seal means includes a ring of low friction fluorocarbon material having a surface in contact with said rod and an interior chamber and resilient means in said interior chamber urging said surface against said rod.

* * * * *